United States Patent
Ikeda et al.

(10) Patent No.: US 11,384,409 B2
(45) Date of Patent: Jul. 12, 2022

(54) HIGH-STRENGTH STEEL SHEET, HIGH-STRENGTH GALVANIZED STEEL SHEET, METHOD FOR PRODUCING HIGH-STRENGTH STEEL SHEET, AND METHOD FOR PRODUCING HIGH-STRENGTH GALVANIZED STEEL SHEET

(71) Applicant: Kobe Steel, Ltd., Kobe (JP)

(72) Inventors: Muneaki Ikeda, Kakogawa (JP); Kenji Saito, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 65 days.

(21) Appl. No.: 16/969,878

(22) PCT Filed: Feb. 6, 2019

(86) PCT No.: PCT/JP2019/004185
§ 371 (c)(1),
(2) Date: Aug. 13, 2020

(87) PCT Pub. No.: WO2019/163513
PCT Pub. Date: Aug. 29, 2019

(65) Prior Publication Data
US 2020/0407818 A1 Dec. 31, 2020

(30) Foreign Application Priority Data
Feb. 21, 2018 (JP) .............................. JP2018-028597

(51) Int. Cl.
*C23C 2/06* (2006.01)
*C22C 38/00* (2006.01)
(Continued)

(52) U.S. Cl.
CPC .............. *C21D 9/46* (2013.01); *B32B 15/01* (2013.01); *B32B 15/013* (2013.01); *B32B 15/04* (2013.01);
(Continued)

(58) Field of Classification Search
CPC ........ C21D 2211/001; C21D 2211/005; C21D 2211/008; C21D 9/46; C21D 8/0226;
(Continued)

(56) References Cited

U.S. PATENT DOCUMENTS

| 2014/0000765 A1 | 1/2014 | Nozaki et al. |
| 2014/0014236 A1 | 1/2014 | Nozaki et al. |
| 2018/0023155 A1* | 1/2018 | Takeda ..................... C21D 9/46 148/548 |

FOREIGN PATENT DOCUMENTS

| JP | 2012-122093 A | 6/2012 |
| JP | 2015-113504 A | 6/2015 |
(Continued)

OTHER PUBLICATIONS

International Search Report dated Apr. 23, 2019 in PCT/JP2019/004185 filed on Feb. 6, 2019.

*Primary Examiner* — Michael E. La Villa
(74) *Attorney, Agent, or Firm* — Oblon, McClelland, Maier & Neustadt, L.L.P.

(57) ABSTRACT

The present invention relates to a high-strength steel sheet which satisfies a specific chemical component composition, and which is configured such that: when the metal structure thereof is observed with a scanning electron microscope, polygonal ferrite is 30 to 60% by area; when the metal structure thereof is observed with an optical microscope, MA mixed structure is 21% by area or less; when the metal structure thereof is measured by an X-ray diffraction method, retained austenite is 8% by volume or more; an area ratio of polygonal ferrite having a circle equivalent diameter
(Continued)

of 35.0 μm or more is 0% and an area ratio of polygonal ferrite having a circle equivalent diameter of 10.0 μm or more and less than 35.0 μm is 10% or less in the polygonal ferrite; and connectivity as defined by a specific relational expression is 10% or more.

5 Claims, 1 Drawing Sheet (51) Int. Cl.
| | |
|---|---|
| C22C 38/02 | (2006.01) |
| C22C 38/04 | (2006.01) |
| C22C 38/06 | (2006.01) |
| C21D 8/02 | (2006.01) |
| C21D 9/46 | (2006.01) |
| C23C 2/02 | (2006.01) |
| C21D 6/00 | (2006.01) |
| B32B 15/04 | (2006.01) |
| B32B 15/18 | (2006.01) |
| C23C 30/00 | (2006.01) |
| C23C 2/26 | (2006.01) |
| B32B 15/01 | (2006.01) |
| C23C 2/40 | (2006.01) |
| C23C 2/28 | (2006.01) |

(52) U.S. Cl.
CPC .......... *B32B 15/043* (2013.01); *B32B 15/18* (2013.01); *C21D 6/00* (2013.01); *C21D 6/001* (2013.01); *C21D 6/005* (2013.01); *C21D 6/008* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C23C 2/02* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *C21D 2211/001* (2013.01); *C21D 2211/005* (2013.01); *C21D 2211/008* (2013.01); *Y10T 428/12799* (2015.01); *Y10T 428/12951* (2015.01); *Y10T 428/12972* (2015.01)

(58) Field of Classification Search
CPC ........ C21D 8/0263; C21D 6/00; C21D 6/001; C21D 6/005; C21D 6/008; C22C 38/00; C22C 38/001; C22C 38/002; C22C 38/02; C22C 38/04; C22C 38/06; C23C 2/02; C23C 2/06; C23C 2/26; C23C 2/28; C23C 2/40; C23C 30/00; C23C 30/005; B32B 15/01; B32B 15/013; B32B 15/014; B32B 15/043; B32B 15/18; B32B 15/04; Y10T 428/12799; Y10T 428/12972; Y10T 428/12951

See application file for complete search history.

(56) References Cited

FOREIGN PATENT DOCUMENTS

| WO | WO 2014/092025 A1 | 6/2014 | |
|---|---|---|---|
| WO | WO 2015/046364 A1 | 4/2015 | |
| WO | WO 2015/151427 A1 | 10/2015 | |
| WO | WO-2016136810 A1 * | 9/2016 | .............. C22C 38/12 |
| WO | WO 2016/158160 A1 | 10/2016 | |

* cited by examiner

HIGH-STRENGTH STEEL SHEET, HIGH-STRENGTH GALVANIZED STEEL SHEET, METHOD FOR PRODUCING HIGH-STRENGTH STEEL SHEET, AND METHOD FOR PRODUCING HIGH-STRENGTH GALVANIZED STEEL SHEET

TECHNICAL FIELD

The present invention relates to a high-strength steel sheet, a high-strength galvanized steel sheet, a method for producing a high-strength steel sheet, and a method for producing high-strength galvanized steel sheet. More specifically, the present invention relates to a high-strength steel sheet having a tensile strength TS (tensile strength) of 980 MPa or more and excellent formability, a high-strength galvanized steel sheet having a galvanized layer on the surface thereof, and a producing method thereof.

BACKGROUND ART

Steel sheets used for automobile structural parts and the like are required to have a high strength of 980 MPa or more so that fuel efficiency is improved. As the strength of a steel sheet increases, formability, such as ductility and hole expandability, decreases, making it difficult to press a component having a complicated shape. Therefore, even a high-strength steel sheet is required to have excellent formability such as ductility (elongation) and hole expandability.

As a steel sheet having both strength and formability, a steel sheet utilizing a TRIP (Transformation Induced Plasticity) phenomenon (hereinafter referred to as "TRIP steel sheet") has been known. The TRIP steel sheet is a steel sheet containing a metastable austenite (hereinafter often referred to as "retained austenite" and often described as "retained γ"). When such a steel sheet is deformed upon receiving stress, transformation into martensite accelerates hardening of the deformed portion to exhibit an effect of preventing concentration of strain, so that uniform deformability is improved to exhibit good elongation.

In addition, when using a TRIP steel sheet with a strength of 980 MPa for structural parts of automobiles, etc., it is also important that a yield stress YS of the steel sheet should be designed within a predetermined range (for example, about 530 to 800 MPa) taking into consideration of dimensional accuracy at the time of forming parts and into consideration of crashworthiness for passengers and people.

As a technique that applies the TRIP steel sheet, a technique such as Patent Literature 1 is also proposed. This technique is shown to improve a strength-ductility-YS balance by controlling each fraction of tempered martensite, ferrite, bainite, retained γ, pearlite and martensite.

However, this technique does not consider at all an important characteristic of "hole expandability" in evaluating formability.

As a technique taking into consideration of hole expandability, for example, a technique such as Patent Literature 2 is proposed. In this technique, among the TRIP steel sheets, it is shown to improve strength, ductility and hole expandability by controlling the pole density in a predetermined crystal orientation as well as by controlling the microstructure of the steel sheet, such as ferrite, bainite, retained γ, martensite, pearlite, and tempered martensite.

However, to satisfy the above requirements in this technique, fine control of hot rolling is necessary, and it cannot be said that grain size and shape of ferrite, which are considered to affect the hole expandability, are sufficiently controlled.

The present invention has been made in view of the above circumstances, and an object thereof is to provide: a high-strength steel sheet excellent in formability, such as elongation and hole expandability, having a high tensile strength TS of 980 MPa or more, and a yield stress YS in the range of 530 to 800 MPa; a high-strength galvanized steel sheet having a galvanized layer on the surface thereof; and a production method thereof.

CITATION LIST

Patent Literature

Patent Literature 1: Japanese Unexamined Patent Publication No. 2012-122093
Patent Literature 2: Japanese Patent No. 5408383

SUMMARY OF INVENTION

A high-strength steel sheet according to one aspect of the present invention is a steel sheet including, in percent by mass, C: 0.10 to 0.30%,
Si: 1.0 to 3.0%,
Mn: 1.5 to 3.0%,
P: more than 0% to 0.1%,
S: more than 0% to 0.05%,
Al: 0.005 to 1%, and
N: more than 0% to 0.01%, with a balance being iron and inevitable impurities, and satisfies following (1) to (6):

(1) a metal structure of the steel sheet includes polygonal ferrite, MA mixed structure, and retained austenite,
(2) when the metal structure is observed with a scanning electron microscope, the polygonal ferrite is 30 to 60% by area with respect to the whole metal structure,
(3) when the metal structure is observed with an optical microscope, the MA mixed structure is 21% by area or less in the whole metal structure,
(4) when the metal structure is measured by an X-ray diffraction method, the retained austenite is 8% by volume or more in the whole metal structure,
(5) an area ratio of polygonal ferrite having a circle equivalent diameter of 35.0 μm or more is 0% and an area ratio of polygonal ferrite having a circle equivalent diameter of 10.0 μm or more and less than 35.0 μm is 10% or less in the polygonal ferrite, and
(6) connectivity as defined by the following formula (I) is 10% or more with respect to the metal structure.

Connectivity (%)=(Interface length between polygonal ferrites/interface length between polygonal ferrite and hard structure)×100     (I)

The present invention also includes a high-strength galvanized steel sheet having a hot-dip galvanized layer or a hot-dip galvannealed layer on the surface of the high-strength steel sheet.

Further, the present invention includes a method for producing the high-strength steel sheet, the method including, in this order:

a primary heating process of heating a hot-rolled steel sheet satisfying the chemical component composition described above to $Ac_1$ point at an average heating rate of 10° C./sec or more and less than 20° C./sec after pickling and cold rolling, a secondary heating process of heating the steel sheet to a temperature of ($Ac_3$ point—100° C.) to ($Ac_3$ point—30° C.), a primary cooling process of cooling the steel sheet from the heating temperature of ($Ac_3$ point—100° C.) to ($Ac_3$ point—30° C.) down to 650° C. at an average cooling rate of less than 20° C./sec, a secondary cooling process of cooling a temperature range of 650 to 300° C. down to 100° C. or more and less than 300° C. at an average cooling rate at 20° C./sec or more, and a reheating process of reheating the steel sheet to 350° C. or more and 550° C. or less and holding the steel sheet in the same temperature range for 30 seconds or more and 1000 seconds or less.

DESCRIPTION OF EMBODIMENT

The present inventors examined from various angles to achieve the above purpose. As a result, by appropriately controlling the chemical component composition and metal structure of a TRIP steel sheet, particularly by strictly defining the form of polygonal ferrite, it was found that the steel sheet could improve the elongation and hole expandability and could have a tensile strength TS of 980 MPa or more and a yield stress YS in a range of 530 to 800 MPa. The present invention has been completed based on these findings.

According to the present invention, the chemical component composition and metal structure of the steel sheet are properly defined, and particularly the morphology of polygonal ferrite is strictly defined, so that the elongation and hole expandability are good, making it possible to realize a high-strength steel sheet having a tensile strength TS of 980 MPa or more and a yield stress YS in a range of 530 to 800 MPa as well as to achieve a production method thereof.

Hereinafter, an embodiment of the present invention will be described in detail.

First, the metal structure of the high-strength steel sheet according to the present embodiment will be described. The metal structure of the high-strength steel sheet of the present embodiment is a mixed structure including a polygonal ferrite, a MA mixed structure, and a retained austenite (retained $\gamma$).

It is important that when the metal structure is observed with a scanning electron microscope, the amount of polygonal ferrite is 30 to 60% by area with respect to the whole metal structure; when the metal structure is observed with an optical microscope, the MA mixed structure is 21% by area or less with respect to the whole metal structure; and when the metal structure is measured by an X-ray diffraction method, the retained $\gamma$ is 8% by volume or more with respect to the whole metal structure.

The requirements for these metal structures will be explained.

(Polygonal Ferrite: 30 to 60% by Area)

Polygonal ferrite is softer than bainite and has a structure that increases elongation of steel sheet and improves formability. For exerting such an effect, polygonal ferrite should be 30% by area or more, preferably 35% by area or more, and more preferably 40% by area or more, with respect to the whole metal structure. However, when the formation amount of polygonal ferrite becomes excessive, the tensile strength TS and the yield stress YS decrease. Therefore, in the present embodiment, the content of polygonal ferrite is 60% by area or less, preferably 55% by area or less, and more preferably 50% by area or less, with respect to the whole metal structure.

(MA Mixed Structure: 21% by Area or Less)

MA mixed structure (Martensite Austenite constituent) is known as a mixed structure of a fresh martensite and a retained $\gamma$. The MA structure is a structure formed by partially transforming the structure existing as an untransformed austenite into martensite and leaving the rest as austenite in the process of cooling the steel sheet from the heating temperature down to room temperature. This MA mixed structure is distinguished from tempered martensite. The presence of such a MA mixed structure can improve strength and elongation (ductility) of the steel sheet.

However, in the high-strength steel sheet, when the MA mixed structure becomes too large, the hole expandability will decrease, and the yield stress YS will also decrease. Therefore, in the present embodiment, the MA mixed structure is 21% by area or less, preferably 19% by area or less, and more preferably 17% by area or less, with respect to the whole metal structure. The lower limit is not particularly limited, but from the viewpoint of improving the strength-ductility balance, the MA mixed structure is preferably 10% by area or more, and more preferably 13% by area or more, with respect to the whole metal structure.

In the present embodiment, a portion which appears white in optical microscope observations after LePera etching is regarded as the MA mixed structure. Since the fresh martensite and retained $\gamma$ constituting the MA mixed structure are difficult to distinguish from one another in optical microscope observations, the composite structure of fresh martensite and retained $\gamma$ is measured as the MA mixed structure.

(Retained Austenite: 8% by Volume or More)

The retained austenite (retained $\gamma$) is mainly present between laths of the metal structure but may also be present in the form of lumps on the aggregates (e.g., blocks and packets) of lath-like structures and grain boundaries of old $\gamma$. The volume ratio of the retained $\gamma$ can be measured by an X-ray diffraction method. The retained $\gamma$ exhibits a good elongation by transforming into martensite when the steel sheet is deformed by being strained. In other words, the inclusion of the retained $\gamma$ promotes hardening of the portion that is deformed by being strained, and can thereby prevent the concentration of strains. These effects are generally called TRIP effects.

In order to cause the steel sheet to exhibit the TRIP effect, the retained $\gamma$ needs to be incorporated into a proportion of 8% by volume or more, preferably 10% by volume or more, more preferably 12% by volume or more, with respect to the whole metal structure. When the volume ratio of the retained $\gamma$ is too high, the hole expandability of the steel sheet is reduced by the formation of deformation-induced martensite that is coarse at the time of molding. Therefore, the retained $\gamma$ is preferably 20% by volume or less, more preferably 18% by volume or less.

In the steel sheet of the present embodiment, it is necessary to specify the form of polygonal ferrite as follows.

(The area ratio of polygonal ferrite with a circle equivalent diameter of 35.0 μm or more is 0%, and the area ratio of polygonal ferrite with a circle equivalent diameter of 10.0 μm or more and less than 35 μm is 10% or less).

As the grains of polygonal ferrite become coarse, the stress becomes more concentrated, so that the yield stress YS is lowered, and the hole expandability is also deteriorated. Therefore, the area ratio of polygonal ferrite having a circle equivalent diameter of 35.0 μm or more needs to be 0%, and the area ratio of polygonal ferrite having a circle equivalent diameter of 10.0 μm or more and less than 35 μm needs to be 10% or less. The area ratio in the latter case is preferably 7% or less, more preferably 4% or less. The "circle equivalent diameter" means a diameter (phase diameter) when the size (area) of the crystal grains of polygonal ferrite is focused and converted into a circle having the same area.

In the metal structure of the steel sheet of the present embodiment, when the ratio of the "interface length between ferrites" to the "interlace length between ferrite and hard structure" is defined as connectivity according to the following formula (I), the connectivity is 10% or more.

Connectivity (%)=(Interface length between ferrites/ interface length between ferrite and hard structure)×100     (I)

By setting the connectivity to 10% or more, the balance between strength and formability in the steel sheet can be improved. When this connectivity is less than 10%, the amount of strain in the hard structure will increase during processing, so that the occurrence of voids and the development of cracks will be promoted, resulting in deterioration of elongation and hole expandability. In addition, since the concentration of strain on the ferrite is suppressed, the yield stress YS excessively increases. Therefore, the connectivity should be 10% or more, preferably 14% or more, and more preferably 18% or more. The "hard structure" in the above formula (I) is basically a structure other than ferrite, and includes a MA mixed structure, bainite, tempered martensite, pearlite, and the like.

As described above, in the metal structure of the present embodiment, the distribution and connectivity of polygonal ferrite are specified, but if necessary, it is preferable to set an average circle equivalent diameter of polygonal ferrite and a standard deviation of the circle equivalent diameter of polygonal ferrite to an appropriate range.

(Average Circle Equivalent Diameter of Polygonal Ferrite: 10.0 μm or Less, and Standard Deviation of Circle Equivalent Diameter of Polygonal Ferrite: 3.5 μm or Less)

When the average circle equivalent diameter of polygonal ferrite and the standard deviation of circle equivalent diameter of polygonal ferrite increase, the area ratio of coarse grains increases to concentrate stresses, so that the yield stress YS decreases, and the hole expandability also deteriorates. Therefore, the average circle equivalent diameter of polygonal ferrite is preferably set to 10.0 μm or less, more preferably 8.0 μm or less, and still more preferably 6.0 μm or less. The standard deviation of the circle equivalent diameter of polygonal ferrite is preferably 3.5 μm or less, more preferably 3.0 μm or less, and still more preferably 2.5 μm or less.

(Other Structure)

The metal structure of the high-strength steel sheet according to the present embodiment may be composed of polygonal ferrite, MA mixed structure, and retained γ, but may include, as a structure other than the above structure, bainite, tempered martensite, pearlite and the like (hereinafter, these may be referred to as a "residual structure") within a range not impairing the effect of the present invention. Among them, since pearlite reduces the strength and the yield stress YS, the content of pearlite is preferably 5% by area or less when observed with a scanning electron microscope after the section of the steel sheet has been subjected to nital etching.

Next, the component composition of the high-strength steel sheet according to the present embodiment will be described. Hereinafter, the percent (%) in the component composition means a percent by mass.

The high-strength steel sheet satisfies the following: C: 0.10 to 0.30%, Si: 1.0 to 3.0%, Mn: 1.5 to 3.0%, P: more than 0% and 0.1% or less, S: more than 0% and 0.05% or less, Al: 0.005 to 1% and N: more than 0% and 0.01% or less.

(C: 0.10 to 0.30%)

C is an element that enhances the strength of the steel sheet, and is also an element that is necessary to stabilize austenite and secure a retained γ. In the present embodiment, the content of C is 0.10% or more for exhibiting such effects. The content of C is preferably 0.13% or more, and more preferably 0.15% or more. However, when the content of C is excessive, hole expandability and weldability of the steel sheet deteriorate. Therefore, in the present embodiment, the content of C is 0.30% or less, preferably 0.28% or less, and more preferably 0.25% or less.

(Si: 1.0 to 3.0%)

Si is a solid solution strengthening element that contributes to the strengthening of steel sheets. Further, Si is an important element that suppresses precipitation of carbides, condenses the C in austenite for stabilization, secures a retained γ, and improves the elongation. In the present embodiment, the content of Si is 1.0% or more to exhibit such effects. The content of Si is preferably 1.2% or more, and more preferably 1.3% or more. However, when the content of Si becomes excessive, the reverse transformation of polygonal ferrite to austenite does not occur during heating and soaking in annealing, and thus the polygonal ferrite remains in excess, resulting in causing insufficient strength of the steel sheet. In addition, during hot rolling, scales are remarkably formed, and scale marks are left on the surface of the steel sheet, resulting in deterioration of the surface quality. Therefore, in the present embodiment, the content of Si is 3.0% or less, preferably 2.6% or less, and more preferably 2.3% or less.

(Mn: 1.5 to 3.0%)

Mn is an element that acts as a hardenability improving element, suppresses the excessive formation of polygonal ferrite during cooling, and enhances the strength of a steel sheet. Mn also contributes to stabilization of a retained γ. For exhibiting such effects, the content of Mn is 1.5% or more, preferably 1.7% or more, and more preferably 1.9% or more, in the present embodiment. However, when Mn is excessively contained, the formation of bainite is significantly suppressed, so that the content of the MA mixed structure becomes excessive. As a result, deterioration of hole expandability as well as reduction of yield stress YS occurs. In addition, adverse effects such as slab cracking occur. Therefore, in the present embodiment, the content of Mn is 3.0% or less, preferably 2.8% or less, and more preferably 2.7% or less.

(P: More Than 0% and 0.1% or Less)

P is an inevitable impurity, and when contained in excess, P promotes grain boundary embrittlement due to grain boundary segregation, resulting in deterioration of formability at room temperature. Therefore, in the present embodiment, the content of P is 0.1% or less, preferably 0.08% or less, and more preferably 0.05% or less. The content of P is preferably as small as possible, but P is usually contained in about 0.001%.

(S: More Than 0% and 0.05% or Less)

S is an inevitable impurity, and when contained in excess, S finals sulfide inclusions such as MnS, which becomes the starting point of cracking and deteriorates the formability at room temperature. Therefore, in the present embodiment, the content of S is 0.05% or less, preferably 0.01% or less, and more preferably 0.005% or less. The content of S is preferably as small as possible, but S is usually contained in about 0.0001%.

(Al: 0.005 to 1%)

As with Si, Al is an important element for suppressing the precipitation of carbides and securing the retained γ. In addition, Al is an element that also acts as a deoxidizer. For exhibiting such effects, the content of Al is 0.005% or more, preferably 0.010% or more, and more preferably 0.03% or more. However, when the content of Al becomes excessive, many inclusions are precipitated in the steel sheet, resulting in deterioration of formability at room temperature. Thus, in the present embodiment, the content of Al is 1% or less, preferably 0.8% or less, and more preferably 0.5% or less.

(N: More Than 0% and 0.01% or Less)

N is an inevitable impurity, and when contained in excess, a large amount of nitride precipitates to become the starting point of cracking. As a result, the formability at room temperature is deteriorated. Therefore, in the present embodiment, the content of N is 0.01% or less, preferably 0.008% or less, and more preferably 0.005% or less. The content of N is preferably as small as possible, but normally N is contained at about 0.001%.

The basic components of the high-strength steel sheet according to the present embodiment are as described above, and the balance is iron and inevitable impurities other than P, S, and N described above. As the inevitable impurities, mixing elements brought in are permissible depending on the situations of raw materials, materials, production equipment, etc. within a range that does not impair the effects of the present embodiment.

The high-strength steel sheet of the present embodiment may further contain, as another element, at least one of the following elements (a) to (d):
(a) at least one selected from the group consisting of Cr: more than 0% and or less and Mo: more than 0% and 1% or less,
(b) at least one selected from the group consisting of Ti: more than 0% and 0.15% or less, Nb: more than 0% and 0.15% or less, and V: more than 0% and 0.15% or less,
(c) at least one selected from the group consisting of Cu: more than 0% and 1% or less and Ni: more than 0% and 1% or less, and
(d) B: more than 0% and 0.005% or less.

(a) Cr and Mo are elements that suppress the excessive formation of polygonal ferrite during cooling and prevent the strength from being reduced. To exhibit such effects effectively, the content of Cr is preferably 0.02% or more, more preferably 0.1% or more, and still more preferably 0.2% or more. The content of Mo is preferably 0.02% or more, more preferably 0.1% or more, and still more preferably 0.2% or more.

However, when Cr and Mo are excessively contained, similarly to Mn, the formation of bainite is remarkably suppressed, and the MA mixed structure becomes excessive, so that the hole expandability is deteriorated and the yield stress YS is lowered. Therefore, in the present embodiment, the content of Cr is preferably 1% or less, more preferably 0.8% or less, and still more preferably 0.5% or less. The content of Mo is preferably 1% or less, more preferably 0.8% or less, and still more preferably 0.5% or less. One of Cr and Mo may be contained, or both of Cr and Mo may be contained.

(b) Ti, Nb, and V are all elements that act to refine the metal structure so that the strength, the yield stress YS and the hole expandability of the steel sheet are improved. To exhibit such effects effectively, the content of Ti is preferably 0.01% or more, more preferably 0.015% or more, and still more preferably 0.020% or more. The content of Nb is preferably 0.01% or more, more preferably 0.015% or more, and still more preferably 0.020% or more. The content of V is preferably 0.01% or more, more preferably 0.015% or more, and still more preferably 0.020% or more.

However, the effect is saturated even if Ti, Nb, and V are contained in excess. In addition, carbides may precipitate at grain boundaries, resulting in deterioration of formability at room temperature. Therefore, in the present embodiment, the content of Ti is preferably 0.15% or less, more preferably 0.12% or less, and still more preferably 0.10% or less. The content of Nb is preferably 0.15% or less, more preferably 0.12% or less, and still more preferably 0.10% or less. The content of V is preferably 0.15% or less, more preferably 0.12% or less, and still more preferably 0.10% or less. Any one of Ti, Nb, and V may be contained, or two or more kinds thereof arbitrarily selected may be contained.

(c) Cu and Ni are elements that act to improve the corrosion resistance of steel sheets. To exhibit such effects effectively, the content of Cu is preferably 0.01% or more, more preferably 0.05% or more, and still more preferably 0.10% or more. The content of Ni is preferably 0.01 or more, more preferably 0.05% or more, and still more preferably 0.10% or more.

However, the effect is saturated even if Cu and Ni are excessively contained. Moreover, hot formability may deteriorate. Therefore, in the present embodiment, the content of Cu is preferably 1% or less, more preferably 0.8% or less, and still more preferably 0.5% or less. The content of Ni is preferably 1% or less, more preferably 0.8% or less, and still more preferably 0.5% or less. Either one or both of Cu and Ni may be contained.

(d) As with Cr and Mn, B is an element that suppresses excessive formation of polygonal ferrite during cooling and prevents the strength from being reduced. To effectively exhibit such effects, the content of B is preferably 0.0001% or more, more preferably 0.0005% or more, and still more preferably 0.0010% or more.

However, when B is contained in excess, as with Cr and Mn, the formation of bainite is significantly suppressed and the content of MA becomes excessive, so that deterioration of hole expandability as well as decrease of yield stress YS occurs. Therefore, in the present embodiment, the content of B is preferably 0.005% or less, more preferably 0.004% or less, and still more preferably 0.003% or less.

A hot-dip galvanized (GI) layer or a hot-dip galvannealed (GA) layer may be provided on the surface of the high-strength steel sheet. That is, the present invention also includes a high-strength hot-dip galvanized steel sheet and a high-strength hot-dip galvannealed steel sheet, each having a hot-dip galvanized layer or a hot-dip galvannealed layer on the surface of the high-strength steel sheet.

Figure 1:
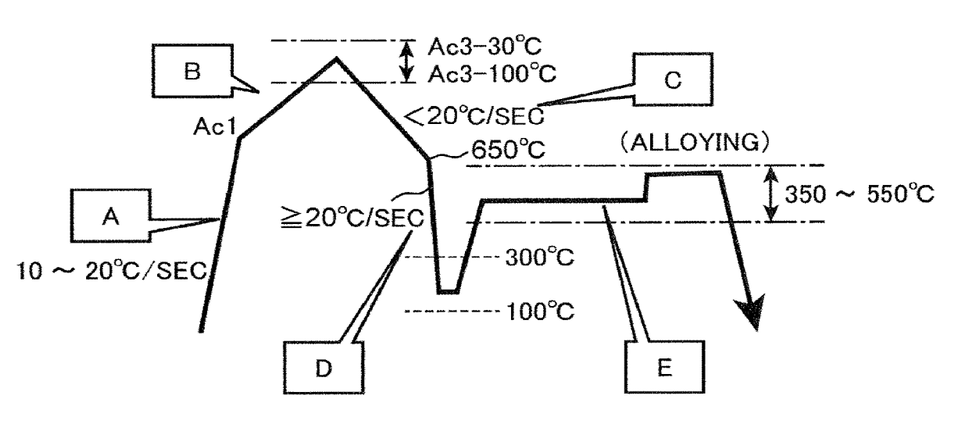
FIG. 1 is a schematic diagram showing an annealing pattern when a high-strength steel sheet according to the present embodiment is produced.

Next, a method for producing the high-strength steel sheet according to the present embodiment will be described with reference to the drawings. FIG. 1 is a schematic diagram showing an annealing pattern when producing the high-strength steel sheet according to the present embodiment, in which the horizontal direction indicates time (seconds) and the vertical direction indicates temperature (° C.).

The pattern shown in FIG. 1 shows the processes after annealing, and the processes up to that point are not limited in any way, and may follow the usual conditions. For example, a slab cast by a continuous casting method, an ingot method, a thin slab casting method or the like is reheated to about 1150 to 1300° C., and after rough rolling, a finish rolling may be performed at a finish rolling temperature of about 850 to 950° C. so as not to form a texture that hinders formability. Then, a hot rolled sheet may be coiled at about 500 to 700° C. to form a hot rolled coiling sheet. Subsequently, if necessary, the sheet is pickled and subjected to cold rolling. After the hot rolling, the coiled sheet may be placed in, for example, a heat insulating device to keep it warm. Before or after pickling, annealing or the like may be performed in a heating furnace.

Primary Heating Process

First, a hot-rolled steel sheet satisfying the above chemical component composition is pickled and cold-rolled, and then heated to an $Ac_1$ point at an average heating rate of 10° C./sec or more and less than 20° C./sec [process (A) of FIG. 1]. In this primary heating process, when heated up to the $Ac_1$ point, recrystallization is promoted to homogenize the metal structure. When the average heating rate at this time is less than 10° C./sec, recrystallization proceeds excessively and coarse ferrite is formed, so that the yield stress YS decreases, and the hole expandability also deteriorates. On the other hand, when the average heating rate is higher than 20° C./sec, recrystallization does not proceed and strain during cold rolling remains, so that the deformability of ferrite decreases, and the elongation as well as the hole expandability deteriorates.

The $Ac_1$ point can be calculated from the following formula (II) described in "Leslie Tekkou Zairyogaku" (originally titled "The Physical Metallurgy of Steels", published by Maruzen Co., Ltd., written by William C. Leslie, published May 31, 1985, p. 273). In the following formula (II), the square brackets [ ] indicate the content (% by mass) of each element, and the content of an element not contained in the steel sheet may be calculated as 0% by mass.

$$Ac_1 \text{ point } (°C.)=723-10.7\times[Mn]-16.9\times[Ni]+29.1\times[Si]+16.9\times[Cr] \quad \text{(II)}$$

Secondary Heating Process

After the primary heating under the above conditions, the steel sheet is heated to a temperature range of ($Ac_3$ point—100° C.) to ($Ac_3$ point—30° C.) [process (B) of FIG. 1]. In this secondary heating process, reverse transformation from ferrite, which is a hot-rolled structure, to austenite is promoted, so that not only coarsening of polygonal ferrite is suppressed but also the fraction of polygonal ferrite is adjusted. When the heating temperature in this process is less than ($Ac_3$ point—100° C.), the reverse transformation becomes insufficient, so that polygonal ferrite is excessively formed. When the heating temperature is higher than ($Ac_3$ point—30° C.), such reverse transformation to austenite proceeds too much, and thus the fraction of polygonal ferrite becomes too small.

The $Ac_3$ point can be calculated from the following formula (III) described in "Leslie Tekkou Zairyogaku" (originally titled "The Physical Metallurgy of Steels", published by Maruzen Co., Ltd., written by William C. Leslie, published May 31, 1985, p. 273). In the following formula (III), the square brackets [ ] indicate the content (% by mass) of each element, and the content of an element not contained in the steel sheet may be calculated as 0% by mass.

$$Ac_3 \text{ point } (°C.)=910-203\times[C]^{1/2}-15.2\times[Ni]+44.7\times[Si]+104\times[V]+31.5\times[Mo]+13.1\times[W]-\{30\times[Mn]+11\times[Cr]+20\times[Cu]-700\times[P]-400\times[Al]-120\times[As]-400\times[Ti]\} \quad \text{(III)}$$

Primary Cooling Process

The primary cooling process includes cooling from the heating temperature in the secondary heating process to 650° C. at an average cooling rate of less than 20° C./sec [process (C) of FIG. 1]. In this process, ferrite is grown to increase the connectivity of polygonal ferrite, so that the fraction of polygonal ferrite is adjusted. When the average cooling rate in the primary cooling process is 20° C./sec or more, the growth of ferrite becomes insufficient. As a result, the connectivity becomes low or the formation of polygonal ferrite becomes insufficient. The average cooling rate in the primary cooling process is preferably 15° C./sec or less.

Secondary Cooling Process

The secondary cooling process is performed as follows: after the primary cooling, the temperature range of 650 to 300° C. is cooled to 100° C. or more and less than 300° C. at an average cooling rate of 20° C./sec or more [process (D) of FIG. 1]. In this secondary cooling process, martensite is formed in the steel sheet structure by cooling to a temperature at or below the martensite transformation start temperature Ms point at an average cooling rate equal to or more than the critical cooling rate, and tempered by subsequent heating to ensure the yield stress YS. When the cooling rate at this time is too slow or the cooling stop temperature is too high, martensite cannot be sufficiently formed, thereby causing an increase of the MA mixed structure. When the cooling stop temperature is too low, excessive martensite will be formed, and the retained γ will be too small. The average cooling rate at that moment is preferably 25° C./sec or more, but the upper limit thereof is generally 100° C./sec or less.

The temperature at the Ms point is calculated based on the following formula (IV) described in "Leslie Tekko Zairyogaku" (originally titled "The Physical Metallurgy of Steels", published by Maruzen Co., Ltd., written by William C. Leslie, published May 31, 1985, p. 273). In the following formula (IV), the square brackets [ ] indicate the content (% by mass) of each element, and the content of an element not contained in the steel sheet may be calculated as 0%.

$$Ms \text{ point } (°C.)=561-474\times[C]-33\times[Mn]-17\times[Ni]-17\times[Cr]-21\times[Mo] \quad \text{(IV)}$$

Reheating Process

After the secondary cooling process, the steel sheet is reheated to 350° C. or more and 550° C. or less and then held in the same temperature range for 30 seconds or more and 1000 seconds or less [process (E) of FIG. 1]. In this reheating process, the content of retained γ is ensured by advancing bainite transformation to accelerate carbon to be enriched in untransformed austenite. When the reheating temperature deviates from the above temperature range or the holding time becomes shorter than 30 seconds, bainite cannot be sufficiently formed to decrease the content of retained γ. This holding time is preferably 50 seconds or more. However, even if this holding time becomes too long, the above effect will be saturated, so such a holding time is set to 1000 seconds or less, preferably 500 seconds or less.

Plating

A hot-dip galvanized layer (GI) or a hot-dip galvannealed layer (GA) may be formed on the surface of the high-strength steel sheet produced as described above.

The conditions for forming the hot-dip galvanized layer and the hot-dip galvannealed layer are not particularly limited, and conventional hot-dip galvanizing treatment and hot-dip galvannealing treatment can be adopted. Thereby, a hot-dip galvanized steel sheet (hereinafter often referred to as "GI steel sheet") and a hot-dip galvannealed steel sheet (hereinafter often referred to as "GA steel sheet") are obtained.

As a method for producing a GI steel sheet, the reheating process may be combined with the hot-dip galvanizing treatment. That is, after being reheated to a temperature range of 350° C. or more and 550° C. or less, the steel sheet is immersed in a plating bath adjusted to the temperature range to carry out hot-dip galvanizing, so that the hot-dip galvanizing treatment and the holding at the predetermined temperature in the reheating process may both be performed. At this time, the residence time in the temperature range may satisfy the holding time requirement (30 seconds or more and 1000 seconds or less).

As a method for producing a GA steel sheet, the steel sheet may be reheated to a temperature range of 350° C. or more and 550° C. or less, and then subjected to an alloying treatment in a furnace of such a temperature range. At this time, the residence time in the above temperature range (the total residence time of the hot-dip galvanizing treatment and the alloying treatment) may satisfy the requirement of the above holding time (30 seconds or more and 1000 seconds or less).

The amount of zinc plating applied is not particularly limited, and may be, for example, about 10 to 100 g/m$^2$ per one side.

The sheet thickness of the high-strength steel sheet according to the present embodiment is not particularly limited but may be a thin steel sheet having a sheet thickness of, for example, 3 mm or less.

The high-strength steel sheet according to the present embodiment has a tensile strength of 980 MPa or more and is excellent in formability. Such a high-strength steel sheet is preferably used as a material for structural parts of automobiles. Structural parts of automobiles include, for example, parts such as front side and rear side members and crash boxes, as well as reinforcements for pillars (for example, bears, center pillar reinforcements, etc.), roof rail reinforcements, side sills, and floor members, body structural parts such as kick parts, shock-resistant parts such as bumper reinforcements and door impact beams, and seat parts.

A hot-rolled steel sheet satisfying the chemical component composition described above is produced by a method including the primary heating process, the secondary heating process, the primary cooling process, the secondary cooling process, and the reheating process in this order. As a result, there can be obtained a high-strength steel sheet having the following properties: when the metal structure is observed with a scanning electron microscope, polygonal ferrite is 30 to 60% by area; when the metal structure is observed with an optical microscope, MA mixed structure is 21% by area or less; when the metal structure is measured by an X-ray diffraction method, retained austenite is 8% by volume or more; the area ratio of polygonal ferrite having a circle equivalent diameter of 35.0 μm or more is 0% and the area ratio of polygonal ferrite having a circle equivalent diameter of 10.0 μm or more and less than 35.0 μm is 10% or less in the polygonal ferrite; and the connectivity defined by the formula (I) is 10% or more.

Such the high-strength steel sheet of the present embodiment has an excellent formability such as elongation and hole expandability, a high tensile strength TS of 980 MPa or more, and a yield stress YS of 530 to 800 MPa.

Out of a variety of forms of techniques disclosed in the present description as described above, the main techniques are summarized as follows.

That is, the high-strength steel sheet according to one aspect of the present invention is a steel sheet which includes, in percent by mass, C: 0.10 to 0.30%,
Si: 1.0 to 3.0%,
Mn: 1.5 to 3.0%,
P: more than 0% to 0.1%,
S: more than 0% to 0.05%,
Al: 0.005 to 1%, and
N: more than 0% to 0.01%, with a balance being iron and inevitable impurities, and which satisfies following (1) to (6):

(1) a metal structure of the steel sheet includes polygonal ferrite, MA mixed structure, and retained austenite,
(2) when the metal structure is observed with a scanning electron microscope, the polygonal ferrite is 30 to 60% by area with respect to the whole metal structure,
(3) when the metal structure is observed with an optical microscope, the MA mixed structure is 21% by area or less in the whole metal structure,
(4) when the metal structure is measured by an X-ray diffraction method, the retained austenite is 8% by volume or more in the whole metal structure,
(5) an area ratio of polygonal ferrite having a circle equivalent diameter of 35.0 μm or more is 0% and an area ratio of polygonal ferrite having a circle equivalent diameter of 10.0 μm or more and less than 35.0 μm is 10% or less in the polygonal ferrite, and
(6) connectivity as defined by the following formula (I) is 10% or more with respect to the metal structure.

$$\text{Connectivity (\%)} = (\text{Interface length between polygonal ferrites/interface length between polygonal ferrite and hard structure}) \times 100 \quad (I)$$

With such a structure, it is possible to obtain a high-strength steel sheet having an excellent elongation and hole expandability, a tensile strength TS of 980 MPa or more, and a yield stress YS of 530 to 800 MPa.

In the high-strength steel sheet, it is preferable that the circle equivalent diameter of the polygonal ferrite is 10.0 μm or less and the standard deviation is 3.5 μm or less. Thereby, it is considered that the above effect can be obtained more reliably.

The high-strength galvanized steel sheet according to another aspect of the present invention is characterized by having a hot-dip galvanized layer or a hot-dip galvannealed layer on the surface of the high-strength steel sheet.

A method for producing a high-strength steel sheet according to a further aspect of the present invention includes, in this order:

a primary heating process of heating a hot-rolled steel sheet that satisfies the chemical component composition described above to Ac1 point at an average heating rate of 10° C./sec or more and less than 20° C./sec after pickling and cold rolling, a secondary heating process of heating the steel sheet to a temperature of ($Ac_3$ point—100° C.) to ($Ac_3$ point—30° C.), a primary cooling process of cooling the steel sheet from the heating temperature of ($Ac_3$ point—100° C.) to ($Ac_3$ point—30° C.) down to 650° C. at an average cooling rate of less than 20° C./sec, a secondary cooling process of cooling the temperature range of 650 to 300° C. down to 100° C. or more and less than 300° C. at an average cooling rate of 20° C./sec or more, and a reheating process of reheating the steel sheet to 350° C. or more and 550° C. or less and holding the steel sheet in the same temperature range for 30 seconds or more and 1000 seconds or less.

By using such a producing method, excellent high-strength steel sheets of the present invention can be produced as described above.

In the producing method, hot-dip galvanizing or hot-dip galvannealing may be performed in the reheating process.

Hereinafter, the present invention will be illustrated more specifically with reference to examples below. It should be noted, however, that the examples are by no means intended to limit the scope of the present invention; that various changes and modifications can naturally be made therein without deviating from the spirit and scope of the present invention as described above and below; and all such changes and modifications should be considered to be within the technical scope of the present invention.

EXAMPLES

Steels (steel types A1 and B1) each having the component composition shown in Table 1 below, with the balance being iron and inevitable impurities, were smelted to produce slabs. Each slab was heated to 1250° C., hot-rolled so that the finish rolling temperature was 920° C., and then coiled at 600° C. After coiling, a hot-rolled steel sheet having a sheet thickness of 2.3 mm was produced by cooling to room temperature.

The scale adhered to the surface of the hot-rolled steel sheet was removed by pickling the surface of the obtained hot-rolled steel sheet. Next, this hot-rolled steel sheet was subjected to cold rolling, thereby to produce a steel sheet having a sheet thickness of 1.4 mm. It should be noted that $Ac_1$ point, $Ac_3$ point, and Ms point shown in the field of "transformation temperature" in Table 1 below are values calculated based on the above formulas (II) to (IV).

TABLE 1

| Steel type | Chemical component composition (% by mass) | | | | | | | $Ac_1$ point (° C.) | $Ac_3$ point (° C.) | Ms point (° C.) |
|---|---|---|---|---|---|---|---|---|---|---|
| | C | Si | Mn | P | S | Al | N | | | |
| A1 | 0.20 | 1.82 | 2.08 | 0.007 | 0.0005 | 0.049 | 0.0033 | 754 | 863 | 398 |
| B1 | 0.20 | 1.86 | 2.08 | 0.007 | 0.0005 | 0.040 | 0.0038 | 755 | 861 | 398 |

With the steel sheet obtained above, it was treated under the annealing conditions shown in Table 2 below. After soaking the steel sheet at the heating temperature of secondary heating shown in Table 2 for 80 seconds, cooling (primary cooling, secondary cooling) and reheating were performed. The sheet temperature at this time was measured at the central portion in the sheet width direction. In the reheating step, hot-dip galvanizing was performed, and finally, the galvanized layer was alloyed by heating to 500° C. and holding for 20 seconds to produce a GA steel sheet. The amount of plating adhered on one surface of the steel sheet was 50 g/m².

TABLE 2

| | | Annealing conditions | | | | | | | | | |
|---|---|---|---|---|---|---|---|---|---|---|---|
| | | Primary heating | Secondary heating | | | Primary cooling | Secondary cooling | | Reheating | | |
| | | Average heating | Heating | | | Average | Average | | | | |
| Test No | Steel type | rate (° C./sec) | temperature (° C.) | $Ac_3$-100° C. (° C.) | $Ac_3$-30° C. (° C.) | cooling rate (° C./sec) | cooling rate (° C./sec) | Temperature (° C.) | Temperature (° C.) | Time (sec) | Remarks |
| 1 | A1 | 11 | 823 | 763 | 833 | 11 | 28 | 150 | 430 | 80 | Example |
| 2 | A1 | 12 | 842 | 763 | 833 | 12 | 28 | 149 | 417 | 80 | Comparative example |

TABLE 2-continued

| | | Annealing conditions | | | | | | | | | |
|---|---|---|---|---|---|---|---|---|---|---|---|
| | | Primary heating | | Secondary heating | | Primary heating | Secondary cooling | | | | |
| | | Average heating rate | Heating temperature | $Ac_3$-100° C. | $Ac_3$-30° C. | Average cooling rate | Average cooling rate | | Reheating | | |
| Test No | Steel type | (° C./sec) | (° C.) | (° C.) | (° C.) | (° C./sec) | (° C./sec) | Temperature (° C.) | Temperature (° C.) | Time (sec) | Remarks |
| 3 | B1 | 9 | 811 | 761 | 831 | 11 | 28 | 160 | 425 | 80 | Comparative example |
| 4 | B1 | 11 | 824 | 761 | 831 | 11 | 28 | 159 | 431 | 80 | Example |

Regarding the obtained GA steel sheet, observation of the metal structure and evaluation of the mechanical properties were performed in the following procedure.

Observation of Metal Structure

Among the metal structures, the area ratios of polygonal ferrite and residual structure (bainite, tempered martensite, pearlite, etc.) of the metal structure were measured based on the results of observation with a scanning electron microscope (SEM), and the area ratio of MA mixed structure was measured based on the results of observation with an optical microscope, and the volume ratio of retained γ was measured by an X-ray diffraction method.

Polygonal Ferrite, MA Mixed Structure, and Residual Structure (Bainite, Tempered Martensite, Pearlite, Etc.)

A test piece was sampled from the center of the sheet width so that the test piece was parallel to the rolling direction of the steel sheet, and a cross section thereof was polished and electrolytically polished to expose a cross section parallel to the rolling direction at a position of ¼ of the sheet thickness of the steel sheet. For the polygonal ferrite in the metal structure of the steel sheet and the residual structures of bainite, tempered martensite, pearlite, etc. constituting the steel sheet, the cross-section of the steel sheet was observed by an SEM to calculate the area ratio in the total metal structure.

The measurement point of the sample was set to a W/4 portion when the length in the direction perpendicular to the rolling was W and a t/4 portion when the sheet thickness was t, and the measurement cross section was parallel both to the rolling direction and to the sheet thickness direction, and the measurement was performed for one visual field.

Also, the MA mixed structure was observed with an optical microscope after the exposed cross section was subjected to LePera etching (magnification: 400 times, 100 μm×100 μm observation visual field, 1 visual field).

Volume Ratio of Retained γ

The volume ratio of retained γ in the metal structure constituting a steel sheet was measured by an X-ray diffraction method. Specifically, the steel sheet was ground to a ¼ position of the sheet thickness, the ground surface was chemically polished, and then the volume ratio of retained γ with respect to the whole metal structure was measured by an X-ray diffraction method. The content of retained γ was calculated using Co-Kα as an incident X-ray, and α-Fe diffraction peaks (110), (200), (211) and γ-Fe diffraction peaks (111), (200), (220), (311).

In addition, the morphology of polygonal ferrite was observed under the following conditions.

Morphology of Polygonal Ferrite

The morphology of polygonal ferrite was measured by an SEM/EBSP (Electron Back Scattered Diffraction Pattern) method under the following measurement conditions.

(Measurement Conditions)

Confidence Index: >0.1

Crystal Grain Boundary: Orientation Difference of 5° or more

Accelerating Voltage: 20 kV

Measurement Range: 50 μm×50 μm

Step: 0.125 μm

Minimum Grain Size: 4 point

The Grain Average IQ map (Image Quality Map) was measured under the above conditions. Since polygonal ferrite with a low strain amount has a high IQ value, a threshold of Average IQ was set for a polygonal ferrite fraction measured from the SEM photograph. That is, polygonal ferrite was defined as being equal to or more than the threshold and hard structure other than the polygonal ferrite was defined as being less than the threshold. The circle equivalent diameter of each polygonal ferrite grain extracted by setting the threshold of Average IQ was measured to determine an average circle equivalent diameter and measure a standard deviation of the circle equivalent diameter of polygonal ferrite.

The connectivity defined by the above formula (I) was defined as a value (L1/L2) obtained by dividing an interface length (L1) between polygonal ferrites by an interface length (L2) between the polygonal ferrite and the hard structure. This measurement procedure is as follows.

(i) A grain boundary length (L0) of the entire structure was measured using a grain boundary map.
(ii) Only polygonal ferrite was extracted, and an interface length (L1) between polygonal ferrites was measured, and
(iii) Only hard structure was extracted and an interface length (L3) between hard structures was measured, and then an interface length (L2) between the polygonal ferrite and the hard structure was determined as (L0−L1−L3).

TABLE 3

| | | Metal structure | | | | | Morphology of polygonal ferrite | | | | |
|---|---|---|---|---|---|---|---|---|---|---|---|
| | | Fraction | | | | | Fraction of circle-equivalent diameter of | Fraction of circle-equivalent | | Average circle- | |
| | | Polygonal | MA mixed | Retained γ | Residual structure | | 35 μm | diameter of | | equivalent | Standard |
| Test No | Steel type | ferrite (% by area) | structure (% by area) | (% by volume) | Pearlite (% by area) | Others | or more (% by area) | 10 to 35 μm (% by area) | Connectivity (%) | diameter (μm) | deviation (μm) |
| 1 | A1 | 48 | 14 | 13 | 0 | Bainite, Tempered martensite | 0 | 0 | 29 | 5.1 | 2.1 |
| 2 | A1 | 9 | 3 | 6 | 0 | Bainite, Tempered martensite | 0 | 0 | 5 | 4.1 | 1.2 |
| 3 | B1 | 47 | 22 | 15 | 0 | Bainite, Tempered martensite | 0 | 13 | 32 | 7.9 | 3.1 |
| 4 | B1 | 48 | 19 | 14 | 0 | Bainite, Tempered martensite | 0 | 8 | 24 | 6.1 | 2.7 |

The strength and formability of each of the obtained high-strength steel sheets (Test Nos. 1 to 4) were evaluated based on the tensile strength TS, the elongation EL, and the hole expansion ratio λ. Each evaluation method is as follows.

(Tensile Strength TS and Elongation EL)

A No. 5 test piece specified in JIS Z2241:2011 was cut out so that the direction perpendicular to the rolling direction of the steel sheets (test pieces Nos. 1 to 4) was the longitudinal direction. The tensile strength TS and elongation EL of each of the test pieces were measured by performing a tensile test based on JIS Z2241:2011 using these test pieces. The measurement results are shown in the fields of "Tensile strength TS" and "Elongation EL" in Table 4 below. The higher the value of the tensile strength TS, the higher the strength of the steel sheet. Further, the higher the value of the elongation EL, the better the formability of the steel sheet. When such an EL was 20% or more, the formability of the steel sheet was determined to be good.

(Hole Expansion Ratio λ)

The hole expansion ratio λ was measured by performing a hole expansion test based on JIS Z2256. The measurement results are shown in "Hole expansion ratio λ" of Table 4 below. The higher the hole expansion ratio λ, the better the hole expandability of the steel sheet. When the hole expansion ratio λ is 25% or more, the formability is determined to be good.

From these results, it can be considered as follows. First, test Nos. 1 and 4 of the steel sheets are produced under appropriate production conditions, and all are examples satisfying the requirements specified in the present invention. It is understood that each of such steel sheets has a high tensile strength of 980 MPa or more and a yield stress YS within a proper range of 530 to 800 MPa and is excellent in high strength and crashworthiness. Further, the elongation EL is 20% or more and the hole expansion ratio λ is maintained at 25% or more, indicating that any of these steel sheets can be determined as their formability being good.

On the other hand, steel sheets of test Nos. 2 and 3 are examples in which any one of the requirements specified in the present invention are deviated, i.e. any one of the characteristics is deteriorated.

Specifically, since test No. 2 had a high secondary heating temperature (Table 2), the content of each of polygonal ferrite and retained γ was small, and each connectivity was also low. As a result, the yield stress YS becomes too high, the crashworthiness deteriorates, and the elongation EL becomes 13%, resulting in deteriorated formability.

In addition, in test No. 3, since the primary heating rate was slow (Table 2), recrystallization of polygonal ferrite was excessively promoted, polygonal ferrite having a circle equivalent diameter of 10 to 35 μm was increased, and the MA mixed structure also became excessive. As a result, not only the yield stress YS becomes too low, resulting in

TABLE 4

| | | Mechanical properties | | | | | |
|---|---|---|---|---|---|---|---|
| Test No | Steel type | Yield stress YS (MPa) | Tensile strength TS (MPa) | Elongation EL (%) | Hole expansion ratio λ (%) | Type of plated steel sheets | Remarks |
| 1 | A1 | 679 | 1034 | 22 | 28 | GA | Example |
| 2 | A1 | 1027 | 1178 | 13 | 70 | GA | Comparative example |
| 3 | B1 | 527 | 1044 | 23 | 21 | GA | Comparative example |
| 4 | B1 | 537 | 1056 | 23 | 26 | GA | Example | deterioration of the crashworthiness, but also the hole expansion ratio λ becomes low to deteriorate the formability.

This application is based on Japanese Patent Application No. 2018-28597 filed on Feb. 21, 2018, the content of which is included in the present application.

While the present invention has been fully and appropriately described above with reference to the drawings by way of an embodiment in order to express the present invention, it is to be recognized that those skilled in the art can readily change and/or modify the embodiment described above. Therefore, it is to be interpreted that the changes or modifications made by those skilled in the art are encompassed within the scope of the claims unless those changes or modifications are at a level that departs from the scope of the claims described in the claims of the present application.

INDUSTRIAL APPLICABILITY

The present invention has wide industrial applicability in the technical fields of steel sheets, galvanized steel sheets and producing methods thereof, and structural parts such as automobiles.

The invention claimed is:

1. A high-strength steel sheet comprising, in percent by mass,
    C: 0.10 to 0.30%,
    Si: 1.0 to 3.0%,
    Mn: 1.5 to 3.0%,
    P: more than 0% to 0.1%,
    S: more than 0% to 0.05%,
    Al: 0.005 to 1%, and
    N: more than 0% to 0.01%,
    with a balance being Fe and inevitable impurities,
    wherein the steel sheet satisfies following (1) to (6):
    (1) a metal structure of the steel sheet comprises polygonal ferrite, MA mixed structure, and retained austenite,
    (2) when the metal structure is observed with a scanning electron microscope, the polygonal ferrite is 30 to 60% by area with respect to whole metal structure,
    (3) when the metal structure is observed with an optical microscope, the MA mixed structure is 21% by area or less with respect to the whole metal structure,
    (4) when the metal structure is measured by an X-ray diffraction method, the retained austenite is 8% by volume or more with respect to the whole metal structure,
    (5) an area ratio of polygonal ferrite having a circle equivalent diameter of 35.0 μm or more is 0% and an area ratio of polygonal ferrite having a circle equivalent diameter of 10.0 μm or more and less than 35.0 μm is 10% or less in the polygonal ferrite, and
    (6) connectivity as defined by the following formula (I) is 10% or more with respect to the metal structure:

Connectivity (%)=(Interface length between polygonal ferrites/interface length between polygonal ferrite and hard structure)×100        (I), where the hard structure is a structure other than ferrite and includes the MA mixed structure, bainite, tempered martensite and pearlite.

2. The high-strength steel sheet according to claim 1, wherein the polygonal ferrite has an average circle equivalent diameter of 10.0 μm or less, and a standard deviation of the circle equivalent diameter of the polygonal ferrite is 3.5 μm or less.

3. A high-strength galvanized steel sheet having a hot-dip galvanized layer or a hot-dip galvannealed layer on the surface of the high-strength steel sheet according to claim 1.

4. A method for producing the high-strength steel sheet according to claim 1, the method comprising, in this order:
    a primary heating process of heating a hot-rolled steel sheet to $Ac_1$ point at an average heating rate of 10° C./sec or more and less than 20° C./sec after pickling and cold rolling, where the hot-rolled steel sheet comprises, in percent by mass, 0.10 to 0.30% of C, 1.0 to 3.0% of Si, 1.5 to 3.0% of Mn, more than 0% to 0.1% of P, more than 0% to 0.05% of S, 0.005 to 1% of Al, and more than 0% to 0.01% of N, with a balance being Fe and inevitable impurities,
    a secondary heating process of heating the steel sheet to a temperature of ($Ac_3$ point−100° C.) to ($Ac_3$ point−30° C.),
    a primary cooling process of cooling the steel sheet from the heating temperature of ($Ac_3$ point−100° C.) to ($Ac_3$ point−30° C.) down to 650° C. at an average cooling rate of less than 20° C./sec,
    a secondary cooling process of cooling a temperature range of 650 to 300° C. down to 100° C. or more and less than 300° C. at an average cooling rate of 20° C./sec or more, and
    a reheating process of heating the steel sheet to 350° C. or more and 550° C. or less and holding the steel sheet in the same temperature range for 30 seconds or more and 1000 seconds or less.

5. The method according to claim 4, wherein hot-dip galvanizing or hot-dip galvannealing is performed in the reheating process.

\* \* \* \* \*